(No Model.)

E. J. MILES.
PNEUMATIC TIRE.

No. 511,207. Patented Dec. 19, 1893.

Witnesses:
J. Ralph Orwig.
R. H. Orwig.

Inventor: Edward J. Miles,
By Thomas C. Orwig, Attorney.

UNITED STATES PATENT OFFICE.

EDWARD J. MILES, OF NEWTON, IOWA.

PNEUMATIC TIRE.

SPECIFICATION forming part of Letters Patent No. 511,207, dated December 19, 1893.

Application filed February 28, 1893. Serial No. 464,045. (No model.)

*To all whom it may concern:*

Be it known that I, EDWARD J. MILES, a citizen of the United States of America, residing at Newton, in the county of Jasper and State of Iowa, have invented an Improved Pneumatic Tire, of which the following is a specification.

The object of my invention is to provide simple, strong, durable and positively operating means whereby a pneumatic tire may be connected with a suitable rim in such a manner that it may be quickly and easily detached therefrom or be firmly clamped thereto as required to prevent the tire from "creeping" upon the rim.

To this end my invention consists in details in the construction of the tire and rim, in passing a metal band around the rim through the tire and in connecting one end thereof with the rim by means of a link that allows flexion between the tire and rim and in the construction and arrangement of mechanism for adjustably connecting the remaining end of the band with the rim as hereinafter set forth, pointed out in my claims and illustrated in the accompanying drawings, in which—

Figure 6:
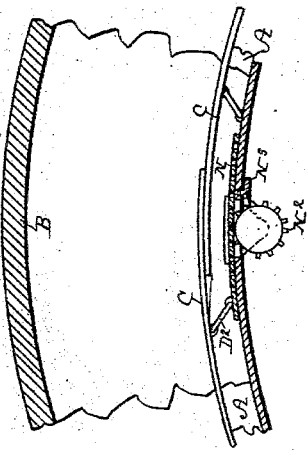
Figure 3:
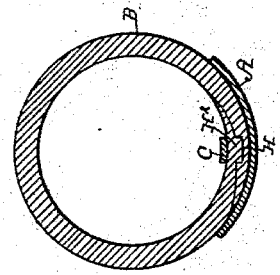
Figure 5:
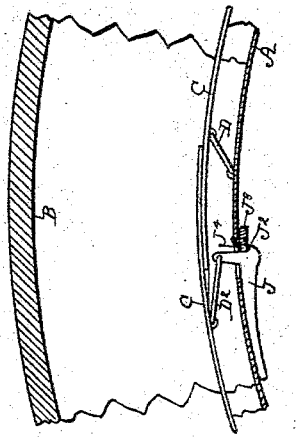
Figure 2:
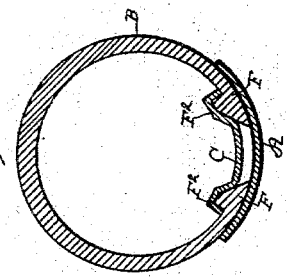
Figure 4:
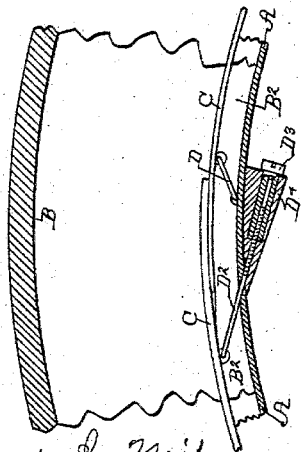
Figure 1:
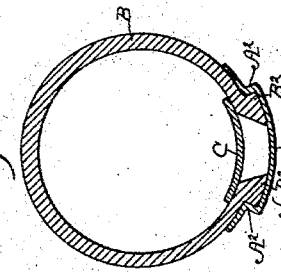

Figure 1, is a transverse sectional view through the tire and rim, showing the preferred forms thereof. Figs. 2 and 3 are like views showing certain modifications. Fig. 4 is a longitudinal sectional view of a portion of the rim and tire showing the preferred form of the device for adjusting the band. Figs. 5 and 6 are like views showing modified forms of adjusting devices, embodying my invention.

Referring to the accompanying drawings the reference letter A is used to designate a wheel rim approximately concavo-convex in transverse section and having the annular shoulders $A^2$ formed therein on opposite sides of its center.

B designates the tire which is made substantially in the usual manner, save that enlarged shoulders $B^2$ are formed on its edges to engage the shoulders $A^2$ of the rim and thereby prevent the detachment of the tire when sufficient pressure is applied to the interior of the tire in the direction of the rim.

C designates a band or strip preferably made of steel and concavo-convex in transverse section and passed completely around the rim at a sufficient distance therefrom to allow the edges of the tire to pass between it and the rim. The ends of this band are preferably overlapped and the following means are employed to provide for the adjustment of the said ends relative to each other.

D designates a link pivotally attached to one of said ends and to the rim, and $D^2$ is a link attached to the remaining end portion of the band at some distance from the point of attachment of the other end.

$D^3$ is a set screw inserted in an internally screw threaded formation $D^4$ which extends longitudinally of the rim on the outside face thereof and has the link $D^2$ connected with its inner end so that an adjustment of the set screw $D^3$ will loosen or tighten the band C upon the rim.

The advantage of connecting the band to the rim by means of links that will allow of a limited movement of the band relative to the rim when loosened is as follows: Upon the release of said band the links will allow the band to disengage the tire and not bind it to the rim (as would a solid connection) to allow of its ready detachment.

The modification shown in Fig. 2 differs from that in Fig. 1 in that the rim is made concavo-convex in transverse section. The edges of the tire have shoulders F formed on their edges and the band C is provided with annular grooves $F^2$ on its edge portions to admit the said shoulder F and the modification shown in Fig. 3 shows the edges of the tire to be tapered to overlap where they engage the rim. An annular groove H, formed in one of the edges, and a mating shoulder $H^2$ formed in the other edge to enter said groove, prevent their moving relative to each other, and the band C may be placed directly on top of the said groove and shoulder.

The modified forms of fastening device shown in Figs. 5 and 6 are constructed as follows. J designates a bell crank lever extended through an opening formed in the rim and having the link $D^2$ pivotally attached to its inner end and with its outer end adapted to lie parallel with the rim or be turned at right angles relative thereto to loosen the band C. This bell crank lever is adapted to be secured in position lying parallel with the rim by means of the lug $J^2$ formed thereon and adapted to rest upon the head of a set screw $J^3$ placed in the rim and provided with a slot $J^4$ through which the said lug may pass when the set screw is brought into coincidence therewith, and in the modification shown in Fig. 6 a rack N is connected with the link $D^2$ and adapted to lie parallel with the inside face of the rim and a pinion $N^2$ is rotatably mounted in the rim to engage the said rack. A slotted set screw $N^3$ like the one $J^3$ is placed in juxtaposition to the said pinion to be passed between the teeth thereof to prevent the rotation of the pinion.

I prefer to use an inner tube of the ordinary kind in connection with the tire, which inner tube may be removed for purposes of repair, &c., as follows: The tire is first deflated in the usual manner. The band C is then loosened to thereby allow the edges of the tire to be pulled outwardly and detached from the rim. To replace the tire upon the rim the inner tube is first placed in position, the edges of the tire then passed under the band C and the said band tightened upon the rim to firmly clasp the tire to the rim.

Having thus described the construction and operation of the tire, what I claim as my invention, and desire to secure by Letters Patent of the United States therefor, is—

1. An improved pneumatic tire comprising the following elements in combination, to wit: a suitable rim approximately concavo-convex in transverse section, a metal band passed around said rim, a link D pivotally attached to the periphery of said rim and also pivotally attached to one end of said band, a screw threaded rod $J^2$ pivotally attached to the remaining end of said metal band extended through an opening in the rim and a set screw to engage the screw threaded portion of said rod and provide means whereby the metal band may be tightened in the rim, and a suitable tire adapted to have its edges inserted between the said metal band and rim substantially as and for the purposes stated.

2. An improved pneumatic tire, comprising the following elements in combination, to wit: a rim approximately concavo-convex in transverse section and having the shoulders $A^2$ formed therein as set forth, a tire B having the shoulder $B^2$ formed in its edges a metal band C passed around the said rim a link D pivotally attached to the periphery of the rim and pivoted to one end of said band, a screw-threaded rod $D^2$ connected with the other end of said band a set screw $D^3$ connected with said rod and a formation $D^4$ in the rim adapted to receive said set screw substantially as and for the purposes stated.

EDWARD J. MILES.

Witnesses:
J. RALPH ORWIG,
THOMAS G. ORWIG.